United States Patent
Itoh

(10) Patent No.: US 11,298,779 B2
(45) Date of Patent: Apr. 12, 2022

(54) BRAZING SHEET AND MANUFACTURING METHOD THEREOF

(71) Applicant: UACJ Corporation, Tokyo (JP)

(72) Inventor: Yasunaga Itoh, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 0 days.

(21) Appl. No.: 16/758,238

(22) PCT Filed: Nov. 6, 2018

(86) PCT No.: PCT/JP2018/041166
§ 371 (c)(1),
(2) Date: Apr. 22, 2020

(87) PCT Pub. No.: WO2019/093317
PCT Pub. Date: May 16, 2019

(65) Prior Publication Data
US 2020/0338671 A1    Oct. 29, 2020

(30) Foreign Application Priority Data

Nov. 8, 2017  (JP) .............................. JP2017-215560

(51) Int. Cl.
*B32B 15/01*    (2006.01)
*B23K 35/02*    (2006.01)
(Continued)

(52) U.S. Cl.
CPC ...... *B23K 35/0233* (2013.01); *B23K 35/0238* (2013.01); *B23K 35/286* (2013.01);
(Continued)

(58) Field of Classification Search
None
See application file for complete search history.

(56) References Cited

U.S. PATENT DOCUMENTS 4,146,163 A    3/1979   Anderson et al.
5,171,377 A    12/1992  Shimizu et al.
(Continued)

FOREIGN PATENT DOCUMENTS

CN    1298205 A    6/2001
CN    1416377 A    5/2003
(Continued)

OTHER PUBLICATIONS

English translation of the International Search Report dated Feb. 5, 2019 for parent application No. PCT/JP2018/04166.
(Continued)

*Primary Examiner* — Daniel J. Schleis
(74) *Attorney, Agent, or Firm* — J-Tek Law PLLC; Jeffrey D. Tekanic; Scott T. Wakeman

(57) ABSTRACT

A brazing sheet brazing suitable for brazing performed in an inert gas atmosphere or in a vacuum without using a flux has a three-layer composition. An aluminum alloy core material contains Mg: 1.3 mass % or less. An aluminum alloy intermediate material is layered on the core material and contains Mg: 0.40-6.0 mass %. An aluminum alloy filler material is layered on the intermediate material and contains Si: 6.0-13.0 mass %, Bi: 0.0040-0.070 mass %, and Mg: 0.050-0.10 mass %.

20 Claims, 1 Drawing Sheet

(51) Int. Cl.
   *B23K 35/28*     (2006.01)
   *C22C 21/00*     (2006.01)
   *C22C 21/02*     (2006.01)
   *C22C 21/06*     (2006.01)
   *B23K 103/10*    (2006.01)

(52) U.S. Cl.
   CPC ............ B32B 15/016 (2013.01); C22C 21/00 (2013.01); C22C 21/02 (2013.01); C22C 21/06 (2013.01); *B23K 2103/10* (2018.08); *Y10T 428/12764* (2015.01)

(56) References Cited

U.S. PATENT DOCUMENTS

| | | |
|---|---|---|
| 6,113,667 A | 9/2000 | Hyogo et al. |
| 6,341,651 B1 | 1/2002 | Ohta |
| 7,018,722 B2 | 3/2006 | Toyama et al. |
| 7,107,680 B2 | 9/2006 | Ueda |
| 7,337,941 B2 | 3/2008 | Kilmer et al. |
| 7,926,701 B2 | 4/2011 | Dulac et al. |
| 8,043,711 B2 | 10/2011 | Koshigoe et al. |
| 8,247,083 B2 | 8/2012 | Izumi et al. |
| 8,413,876 B2 | 4/2013 | Dulac et al. |
| 8,455,110 B2 * | 6/2013 | Wittebrood .......... B23K 35/002 428/654 |
| 9,744,610 B2 | 8/2017 | Terada et al. |
| 2001/0040180 A1 | 11/2001 | Wittebrood et al. |
| 2002/0012811 A1 | 1/2002 | Wittebrood et al. |
| 2002/0037425 A1 | 3/2002 | Mooij et al. |
| 2002/0086179 A1 | 7/2002 | Wittebrood |
| 2002/0102431 A1 | 8/2002 | Wittebrood et al. |
| 2004/0009358 A1 | 1/2004 | Scott et al. |
| 2004/0028940 A1 | 2/2004 | Toyama et al. |
| 2004/0238605 A1 | 12/2004 | Nishimura et al. |
| 2005/0006065 A1 | 1/2005 | Katsumata et al. |
| 2005/0034848 A1 | 2/2005 | Ueda |
| 2005/0189047 A1 | 9/2005 | Hasegawa et al. |
| 2006/0000586 A1 | 1/2006 | Katsumata et al. |
| 2007/0017605 A1 | 1/2007 | Nakamura et al. |
| 2007/0158386 A1 | 7/2007 | Dulac et al. |
| 2008/0003451 A1 | 1/2008 | Suzuki et al. |
| 2009/0165901 A1 | 7/2009 | Koshigoe et al. |
| 2010/0266871 A1 | 10/2010 | Matsuo et al. |
| 2011/0114228 A1 | 5/2011 | Nakamura et al. |
| 2011/0240280 A1 | 10/2011 | Izumi et al. |
| 2011/0287276 A1 | 11/2011 | Izumi et al. |
| 2012/0145365 A1 | 6/2012 | Yamashita et al. |
| 2014/0322558 A1 | 10/2014 | Takeda et al. |
| 2014/0329109 A1 | 11/2014 | Takewaka et al. |
| 2015/0000783 A1 | 1/2015 | Terada et al. |
| 2015/0037607 A1 | 2/2015 | Itoh et al. |
| 2015/0068713 A1 | 3/2015 | Sucke et al. |
| 2015/0118517 A1 | 4/2015 | Itoh et al. |
| 2015/0165564 A1 | 6/2015 | Ahl et al. |
| 2015/0239071 A1 | 8/2015 | Kiga |
| 2016/0332209 A1 | 11/2016 | Yamashita et al. |
| 2017/0151637 A1 | 6/2017 | Ichikawa et al. |
| 2017/0151638 A1 | 6/2017 | Itoh et al. |
| 2017/0282271 A1 | 10/2017 | Itoh et al. |
| 2018/0133845 A1 | 5/2018 | Itoh et al. |
| 2018/0141166 A1 | 5/2018 | Itoh et al. |
| 2018/0214964 A1 | 8/2018 | Itoh et al. |
| 2018/0282843 A1 | 10/2018 | Hasegawa et al. |
| 2019/0291218 A1 | 9/2019 | Itoh et al. |
| 2019/0314916 A1 | 10/2019 | Itoh et al. |
| 2019/0337074 A1 | 11/2019 | Miyake |
| 2020/0061758 A1 | 2/2020 | Itoh et al. |

FOREIGN PATENT DOCUMENTS

| | | |
|---|---|---|
| CN | 1572407 A | 2/2005 |
| CN | 1831171 A | 9/2006 |
| CN | 1886527 A | 12/2006 |
| CN | 101469960 A | 7/2009 |
| CN | 101871062 A | 10/2010 |
| CN | 102003841 A | 4/2011 |
| CN | 102205676 A | 10/2011 |
| CN | 102251155 A | 11/2011 |
| CN | 102803891 A | 11/2012 |
| CN | 103097850 A | 5/2013 |
| CN | 104080934 A | 10/2014 |
| CN | 104249224 A | 12/2014 |
| CN | 106944762 A | 7/2017 |
| DE | 19744734 A1 | 4/1999 |
| DE | 102008009695 A1 | 9/2008 |
| DE | 202012003090 U1 | 4/2012 |
| DE | 102012200828 A1 | 8/2012 |
| EP | 0659519 A1 | 6/1995 |
| EP | 0847830 A2 | 6/1998 |
| EP | 1127653 A2 | 8/2001 |
| EP | 1287934 A1 | 3/2003 |
| EP | 1533070 A1 | 5/2005 |
| EP | 1679146 A1 | 7/2006 |
| EP | 2418042 A1 | 2/2012 |
| EP | 2447662 A1 | 5/2012 |
| EP | 2578344 A1 | 4/2013 |
| EP | 2848354 A1 | 3/2015 |
| EP | 3176273 A1 | 6/2017 |
| JP | S61293699 | 12/1986 |
| JP | H01225736 A | 9/1989 |
| JP | H03124394 A | 5/1991 |
| JP | H03226396 A | 10/1991 |
| JP | H0525576 A | 2/1993 |
| JP | H0778869 B2 | 8/1995 |
| JP | H07227695 A | 8/1995 |
| JP | H07303858 A | 11/1995 |
| JP | H0852565 A | 2/1996 |
| JP | H0985433 A | 3/1997 |
| JP | H1034375 A | 2/1998 |
| JP | H1034378 A | 2/1998 |
| JP | H10180489 A | 7/1998 |
| JP | H11183085 A | 7/1999 |
| JP | H11221696 A | 8/1999 |
| JP | 2000063970 A | 2/2000 |
| JP | 2000167688 A | 6/2000 |
| JP | 2000202620 A | 7/2000 |
| JP | 2000202680 A | 7/2000 |
| JP | 2000225461 A | 8/2000 |
| JP | 3160099 B2 | 4/2001 |
| JP | 3212927 B2 | 9/2001 |
| JP | 2002079370 A | 3/2002 |
| JP | 2002161323 A | 6/2002 |
| JP | 2002267382 A | 9/2002 |
| JP | 200394165 A | 4/2003 |
| JP | 2003126986 A | 5/2003 |
| JP | 2004025297 A | 1/2004 |
| JP | 2004042086 A | 2/2004 |
| JP | 2004076057 A | 3/2004 |
| JP | 2004084060 A | 3/2004 |
| JP | 2004330233 A | 11/2004 |
| JP | 2005060790 A | 3/2005 |
| JP | 2005523163 A | 8/2005 |
| JP | 2005256166 A | 9/2005 |
| JP | 2006043735 A | 2/2006 |
| JP | 2006175500 A | 7/2006 |
| JP | 2006213934 A | 8/2006 |
| JP | 2006255755 A | 9/2006 |
| JP | 2006307292 A | 11/2006 |
| JP | 2006348372 A | 12/2006 |
| JP | 2007031730 A | 2/2007 |
| JP | 2007039753 A | 2/2007 |
| JP | 2007044713 A | 2/2007 |
| JP | 2007512143 A | 5/2007 |
| JP | 2007178062 A | 7/2007 |
| JP | 2007216283 A | 8/2007 |
| JP | 2007260733 A | 10/2007 |
| JP | 2008006480 A | 1/2008 |
| JP | 2008100283 A | 5/2008 |
| JP | 2008121108 A | 5/2008 |
| JP | 2008208416 A | 9/2008 |
| JP | 2008261025 A | 10/2008 |
| JP | 2009058139 A | 3/2009 |
| JP | 2009058167 A | 3/2009 |

(56) References Cited

FOREIGN PATENT DOCUMENTS

| | | |
|---|---|---|
| JP | 2009068083 A | 4/2009 |
| JP | 2009106947 A | 5/2009 |
| JP | 2009142870 A | 7/2009 |
| JP | 2009184017 A | 8/2009 |
| JP | 2010075965 A | 4/2010 |
| JP | 2010075966 A | 4/2010 |
| JP | 2010247209 A | 11/2010 |
| JP | 2010255014 A | 11/2010 |
| JP | 2011000614 A | 1/2011 |
| JP | 2011136358 A | 7/2011 |
| JP | 2011247459 A | 12/2011 |
| JP | 2012067994 A | 4/2012 |
| JP | 2013189659 A | 9/2013 |
| JP | 2013194267 A | 9/2013 |
| JP | 2013233552 A | 11/2013 |
| JP | 2014050861 A | 3/2014 |
| JP | 2014083570 A | 5/2014 |
| JP | 2014155955 A | 8/2014 |
| JP | 2014217844 A | 11/2014 |
| JP | 2014226704 A | 12/2014 |
| JP | 2015030861 A | 2/2015 |
| JP | 2015528852 A | 10/2015 |
| JP | 6055573 B1 | 12/2016 |
| JP | 2018001266 A | 1/2018 |
| WO | 2017137236 A1 | 8/2017 |
| WO | 2018100793 A1 | 6/2018 |

OTHER PUBLICATIONS

English translation of the Written Opinion for parent application No. PCT/JP2018/04166.

Office Action and Search Report from the Chinese Patent Office dated Feb. 5, 2021 in related Chinese application No. 201880057591.2, and translation thereof.

Office Action and Search Report from the Chinese Patent Office dispatched Aug. 6, 2021 in counterpart Chinese application No. 201880057591.2, and translation thereof.

Office Action from the Chinese Patent Office dated Jan. 13, 2022 in counterpart Chinese application No. 201880057591.2, and translation thereof.

* cited by examiner

BRAZING SHEET AND MANUFACTURING METHOD THEREOF

CROSS-REFERENCE

This application is the US national stage of International Patent Application No. PCT/JP2018/041166 filed on Nov. 6, 2018, which claims priority to Japanese Patent Application 2017-215560 filed on Nov. 8, 2017.

TECHNICAL FIELD

The present invention relates to a brazing sheet and to a manufacturing method thereof.

BACKGROUND ART

For example, aluminum products, such as heat exchangers, mechanical parts, and the like, have numerous components composed of aluminum materials (which include aluminum and aluminum alloys; likewise, below). It is often the case that these components are brazed using a brazing sheet that has a core material and a filler material, which is provided on at least one surface of the core material. A flux-brazing method is often used as a method of brazing an aluminum material, in which brazing is performed by applying a flux to the surfaces of an intended joint, i.e., the surfaces of a portion that is to be joined by brazing.

However, in flux-brazing methods, after the brazing has been completed, flux and the residue thereof adhere to the surface of the aluminum product. The flux and the residue thereof may cause problems depending on the intended use of the aluminum product. For example, in a heat exchanger equipped with an electronic part, there is a risk that a problem, such as degradation in surface treatability due to flux residue, will occur during the manufacture of the heat exchanger. In addition, for example, in a water-cooled heat exchanger, there is also a risk that a problem will occur, such as clogging caused by the flux or the like in the refrigerant passageways. Furthermore, to remove the flux and the residue thereof, it is necessary to perform an acid-washing process, and the cost of such a process has been viewed as a problem in recent years.

To avoid the above-mentioned problems attendant with the use of flux, depending on the intended usage of the aluminum product, so-called vacuum-brazing methods are also used, in which brazing is performed in a vacuum without the application of flux to the surfaces of the intended joint. However, vacuum-brazing methods have the problems in that productivity is lower than in flux-brazing methods and the quality of the brazed joint tends to deteriorate. In addition, the equipment cost and the maintenance cost are higher in brazing furnaces used in vacuum-brazing methods than in common brazing furnaces.

Accordingly, so-called fluxless-brazing methods have been proposed, in which brazing is performed in an inert-gas atmosphere without applying flux to the surfaces of the intended joint. Brazing sheets used in fluxless-brazing methods contain an element or elements, which function(s) to weaken an oxide film or to break down an oxide film, in at least one layer of the layered structure of the brazing sheet. Mg (magnesium) is often used as this type of element.

For example, a brazing sheet for a vacuum-brazing method that contains 0.1-5.0 mass % of Mg in the filler material is disclosed in Patent Document 1. In addition, a brazing sheet that contains 0.3-3.0 mass % of Mg in the core material is disclosed in Patent Document 2.

PRIOR ART LITERATURE

Patent Documents

Patent Document 1
 Japanese Laid-open Patent Publication 2010-247209
Patent Document 2
 Japanese Laid-open Patent Translation No. 2007-512143

SUMMARY OF THE INVENTION

However, with regard to the brazing sheet of Patent Document 1, the filler material contains a large amount of Mg, which readily oxidizes. Consequently, when brazing is performed in an inert-gas atmosphere using this brazing sheet, there is a risk that, due to a reaction between oxygen contained in the atmosphere in trace amounts and Mg in the filler material, a sturdy oxide film will be formed on the surface of the filler material, which will lead to degradation in brazeability. In addition, at an oxygen concentration in a range that can be achieved by common brazing furnaces, there are problems in that brazing defects often occur, such as fillets being formed discontinuously, fillets scarcely being formed at all, or the like, and in that it is difficult to form a continuous fillet at an intended joint.

With regard to the brazing sheet of Patent Document 2, because Mg is not included in the filler material, it is possible to avoid the above-mentioned degradation in brazeability caused by a filler material containing a large amount of Mg. Incidentally, in this situation, during the time period until Mg in the core material reaches the surface of the filler material, weakening of the oxide film due to Mg does not occur. Furthermore, because Mg diffuses within the core material, which is a solid body, and moves to the filler material, a comparatively long time is needed for Mg to arrive at the surface of the filler material. For this reason, with regard to this brazing sheet, for example, if the thickness of the filler material is large, the temperature-rise rate is high, or the like, then there is a risk that the brazing defects described above will occur.

In addition, in fluxless-brazing methods, there has been a problem in the past in that the quality of the brazed joint tends to degrade depending on the shape and structure of the object to be processed and the location of the intended joint. For example, if brazing of a hollow structure is performed using a fluxless-brazing method, then there is a risk that the filler produced by the heating will be drawn into the interior of the hollow structure, and therefore a brazing defect will occur on an outer surface of the hollow structure. The solution to such a problem is difficult even in the situation in which the brazing sheet of Patent Document 2 is used.

The present invention was conceived considering this background and aims to provide: a brazing sheet, in which brazeability when brazing in an inert-gas atmosphere is satisfactory and an increase in materials cost can be constrained, as well as a manufacturing method thereof.

One aspect of the present invention is a brazing sheet usable in brazing performed in an inert-gas atmosphere or in a vacuum without using a flux, comprising:

a core material having a chemical composition containing Mg (magnesium): 1.3 mass % or less, the remainder being Al (aluminum) and unavoidable impurities;

an intermediate material layered on the core material and having a chemical composition containing Mg: 0.4 mass % or more and 6.0 mass % or less, the remainder being Al and unavoidable impurities; and a filler material layered on the intermediate material and having a chemical composition containing Si (silicon): 6.0 mass % or more and 13.0 mass % or less, Bi (bismuth): 0.0040 mass % or more and 0.070 mass % or less, and Mg: 0.050 mass % or more and less than 0.10 mass %, the remainder being Al and unavoidable impurities.

The brazing sheet comprises the intermediate material, which contains Mg and is layered on the core material, and the filler material, which contains Si, Mg, and Bi. Because the amount of Mg in the filler material is less than in previously existing brazing sheets used in vacuum-brazing methods, oxidation of the filler-material surface during heating when brazing is being performed can be curtailed at the oxygen concentrations attainable in common brazing furnaces. For this reason, in brazing in an inert-gas atmosphere, the brazing sheet can curtail degradation in brazeability caused by oxidation of the filler-material surface.

In addition, in brazing in an inert-gas atmosphere or in brazing in a vacuum, Mg in the filler material rapidly reacts, in the initial stage of brazing, with an oxide film present on the filler-material surface. Thereby, the oxide film present on the filler-material surface can be weakened before the filler material melts.

Thus, in the brazing sheet, the amount of Mg in the filler material is set in an optimal range such that, while inhibiting oxidation of the filler-material surface during brazing in an inert-gas atmosphere, the oxide film on the filler-material surface can be weakened in the initial stage of brazing.

If the heating when brazing is being performed is continued and the temperature of the brazing sheet exceeds approximately 450° C., then the Mg in the intermediate material will diffuse into both the filler material and the core material, which are contiguous with the intermediate material, and therefore the amount of Mg in the filler material and the amount of Mg in the core material will gradually increase. Furthermore, when the filler material melts, Mg in the filler reaches the surface of the filler all at once. At this time, the oxide film present on the filler surface is weakened in the initial stage of brazing, as described above. For this reason, the oxide film can be rapidly broken down by the filler, which contains a large amount of Mg that diffused from the intermediate material.

Furthermore, Bi, which has the effect of increasing the fluidity of the filler by decreasing the surface tension of the filler, is included in the filler material. Consequently, owing to the synergistic effect between the effect of the weakening of the oxide film in the initial stage of the brazing and the effect of improving the fluidity of the filler caused by Bi, the molten filler rapidly wets the intended joint between the brazing sheet and the opposing materials. Furthermore, owing to the fact that a large amount of Mg, which has moved from the intermediate material into the filler, breaks down the oxide film present on the intended joint all at once, a satisfactory fillet can be rapidly formed.

As described above, because the oxide film on the filler-material surface is weakened before the filler material melts, the molten filler can rapidly form a fillet on the intended joint that joins the brazing sheet and the opposing material. Furthermore, because fluidity increases owing to the Bi added into the filler material, the filler tends to collect at the intended joint. Thereby, a sufficient amount of filler is supplied to a location at which the formation of a fillet was difficult for previously existing brazing sheets, such as, for example, on the outer surface of a hollow structure, and thereby a satisfactory fillet can be rapidly formed.

As a result of the above, according to the brazing sheet, a sufficient amount of filler is supplied to the intended joint that joins the opposing materials, and thereby a satisfactory fillet can be rapidly formed. In addition, the brazing sheet can improve, for example, brazeability when brazing a hollow structure and brazeability when the temperature-rise rate is high during brazing.

DETAILED DESCRIPTION

Figure 1:
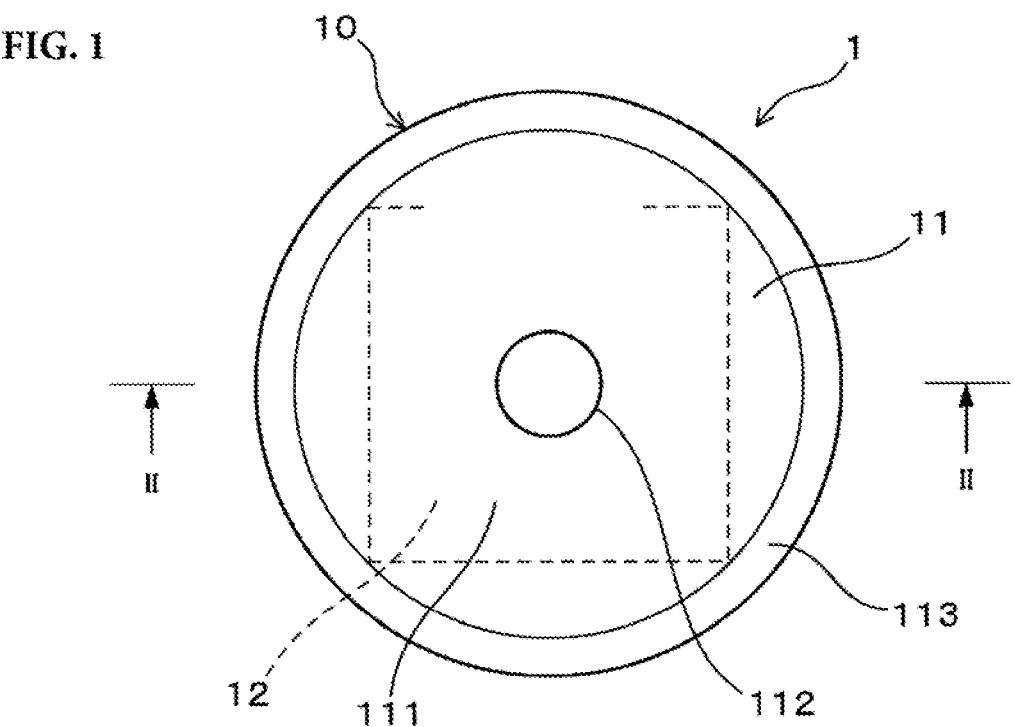
FIG. 1 is a plan view of a cup-shaped test specimen according to a working example.

In the above-mentioned brazing sheet, the intermediate material and the filler material may be layered on only one surface of a core material or may be layered on both surfaces. If the intermediate material and the filler material are layered on one surface of the core material, then well-known filler material, sacrificial anode material, or the like may be provided on the surface that is on the side of the core material that does not have the filler material. In addition, if the filler material is layered on both surfaces of the core material, then the one filler material and the other filler material may have the same chemical composition or may have chemical compositions that differ from one another.

The chemical composition of each layer constituting the brazing sheet and the reasons for restrictions thereof are explained below.

<Core Material>
Mg (magnesium): 1.3 mass % or less

Mg in the above-mentioned specified range may be included in the core material as an optional component. That is, the concept in which the amount of Mg in the core material is 0 mass % is included in the above-mentioned concept referred to as "Mg: 1.3 mass % or less." In this situation, the amount of Mg that diffuses from the intermediate material to the filler material can be further increased. Thereby, brazeability between the brazing sheet and the opposing material can be further improved. In addition, by setting the amount of Mg in the core material in the above-mentioned specified range, in the situation in which the temperature-rise rate during brazing is slow and a comparatively long time is needed until the filler melts completely, Mg can be continuously supplied into the filler after the melting of the filler. As a result, in brazing in which a flux is not used, a fillet can be formed on the intended joint, which joins the opposing materials, more easily. From the viewpoint of further increasing such functions and effects, it is preferable to set the amount of Mg in the core material to 0.20 mass % or more.

If the amount of Mg in the core material is greater than 1.3 mass %, then the molten filler tends to permeate into the core material, and therefore there is a risk that the amount of filler supplied to the intended joint will become insufficient. In addition, in this situation, there is also a risk that the contact angle of the filler with respect to the aluminum material will become excessively small. As a result, there is a risk that it will become difficult to form a fillet.

The amount of Mg in the core material preferably is less than 1.0 mass %. In this situation, ductility can be further increased when manufacturing the core material or when manufacturing the brazing sheet. In addition, by setting the amount of Mg in the core material to less than 1.0 mass %, the heating conditions during brazing can be selected from broader ranges.

The core material may further contain Mn (manganese), Si (silicon), Fe (iron), Cu (copper), Ti (titanium), Zr (zirconium), Cr (chrome), Zn (zinc), In (indium), Sn (tin), and the like as optional components.

Mn: 0.30 mass % or more and 2.0 mass % or less

The core material may further contain Mn. By setting the amount of Mn in the core material to 0.30 mass % or more, the strength of the core material can be further increased. In addition, in this situation, corrosion resistance of the aluminum product can be further improved by adjusting the electric potential of the core material to a suitable range.

However, if the amount of Mn in the core material is excessively large, then there is a risk that cracks will tend to occur during the manufacture of the core material or the brazing sheet. From the viewpoint of avoiding such problems, it is preferable to set the amount of Mn in the core material to 2.0 mass % or less.

Si: 0.30 mass % or more and 1.0 mass % or less

The core material may further contain Si. By setting the amount of Si in the core material to 0.30 mass % or more, the strength of the core material can be further increased. In addition, if Si and Mn both exist in the core material, then the strength of the core material can be further increased.

However, if the amount of Si in the core material is excessively large, then there is a risk that the melting point of the core material will be excessively low and brazeability will be adversely affected. From the viewpoint of avoiding such problems, it is preferable to set the amount of Si in the core material to 1.0 mass % or less.

Fe: less than 1.0 mass %

The core material may further contain Fe. Fe in the core material is effective for increasing the strength of the core material. However, if the Fe content becomes excessively large, then there is a risk that it will lead to degradation in corrosion resistance. In addition, in this situation, there is also a risk that coarse precipitates that include Fe will be produced in the core material, which will lead to a decrease in ductility. By setting the amount of Fe in the core material to less than 1.0 mass %, these problems can be avoided while at the same time the effect of increasing the strength can be obtained.

Cu: 1.0 mass % or less

The core material may further contain Cu. Cu in the core material is effective for increasing the strength of the core material and adjusting the electric potential of the core material. However, if the Cu content becomes excessively large, then there is a risk that the melting point of the core material will decrease, which will lead to degradation in brazeability. In addition, in this situation, there is a risk that intergranular corrosion will tend to occur. By setting the amount of Cu in the core material to 1.0 mass % or less, these problems can be avoided while at the same time the effect of increasing the strength can be obtained.

Ti: less than 0.10 mass %

The core material may further contain Ti. Corrosion tends to progress in layers in a core material containing Ti. For this reason, by adding Ti to the core material, penetration due to corrosion can be impeded for a longer time. However, if the Ti content becomes excessively large, then there is a risk that coarse precipitates will occur in the core material, which will lead to a decrease in ductility. By setting the amount of Ti in the core material to less than 0.10 mass %, these problems can be avoided while, at the same time, perforation due to corrosion can be impeded for a longer time.

Zr: less than 0.30 mass %, Cr: less than 0.30 mass %

The core material may further contain one or two from among these elements. These elements are effective in controlling grain size. However, if the content of Zr or Cr becomes excessively large, cracks will tend to occur during the manufacture of the core material or the brazing sheet. In addition, in this situation, there is a risk that it will lead to a decrease in ductility. By setting the amount of Zr and the amount of Cr in the core material in the above-mentioned specified ranges, these problems can be avoided while at the same time the functions and effects described above can be obtained.

Zn: 0.10 mass % or more and 3.0 mass % or less, In: 0.010 mass % or more and 0.10 mass % or less, Sn: 0.010 mass % or more and 0.10 mass % or less The core material may further contain one or two or more from among these elements. These elements function to reduce the electric potential of the core material. For this reason, by setting the content of these elements in the above-mentioned specified ranges, the core material can be caused to function as a sacrificial anode material. As a result, corrosion of the aluminum product can be impeded for a longer time.

If the content of any one of Zn, In, or Sn is greater than the above-mentioned respective specified ranges, then there is a risk that the electric potential of the core material will become excessively low, and it will become difficult to maintain the sacrificial corrosion-inhibiting effect over the long term. In addition, in this situation, there is a risk that the melting point of the core material will become excessively low, which will lead to degradation in brazeability.

If the core material after brazing has been performed in a vacuum is to be made to function as a sacrificial anode material, then it is preferable to add In and/or Sn to the core material. Because In and Sn tend not to evaporate during heating when brazing is being performed in a vacuum, they tend to remain in the aluminum product after brazing. For this reason, the functions and effects described above can be more reliably exhibited. It is noted that, if the brazing sheet is used in brazing in an inert-gas atmosphere, then the functions and effects described above can be exhibited even if any of these elements are used.

<Intermediate Material>

Mg: 0.40 mass % or more and 6.0 mass % or less

By setting the amount of Mg in the intermediate material in the above-mentioned specified range, it is possible, in brazing in which a flux is not used, to more easily form a fillet at the intended joint that joins opposing materials. If the amount of Mg in the intermediate material is less than 0.40 mass %, then there is a risk that a comparatively long time will be needed until the Mg reaches the filler-material surface and that the amount of Mg that reaches the filler-material surface will also be insufficient. For that reason, in this situation, there is a risk that this will lead to a decrease in brazeability.

On the other hand, if the amount of Mg in the intermediate material is greater than 6.0 mass %, then the amount of Mg that elutes into the filler material will become large, and consequently there is a risk that the surface tension of the molten filler will decrease excessively and therefore it will become difficult to form a fillet. In addition, if the amount of Mg in the intermediate material is greater than 6.0 mass %, then, in the process of manufacturing the brazing sheet, a sturdy oxide film will tend to form on the surface of an intermediate-material mass, which constitutes the base of the intermediate material, and the strength of the intermediate-material mass will also increase. Consequently, when a clad sheet is prepared by joining a core-material mass, which constitutes the base of the core material, an intermediate-material mass, and a filler-material mass, which constitutes the base of the filler material, there is a risk that it will become difficult to join these masses to one another.

In addition to Mg as an essential component, the intermediate material may further contain one or two or more from among Si, Zn, Cu, and Be (beryllium) as optional components.

Si: 1.0 mass % or more and 13.0 mass % or less

By setting the amount of Si in the intermediate material to 1.0 mass % or more, the diffusion rate of the Mg within the intermediate material in the temperature range of 570° C. or higher can be further increased. Thereby, brazeability in the situation in which the temperature-rise rate is rapid can be further improved. In addition, by setting the amount of Si in the intermediate material to 3.0 mass % or more, the temperature at which the intermediate material starts to melt can be decreased to approximately the same as that of the filler material. Thereby, the large amount of Mg starting from immediately after the filler material starts to melt can be supplied to the filler-material surface, and therefore the oxide film on the filler-material surface can be more rapidly broken down.

On the other hand, if the Si content in the intermediate material is excessively large, then it is difficult to obtain an effect commensurate with that content and, moreover, in the process of manufacturing the brazing sheet, cracks tend to occur in the intermediate material. In addition, in this situation, because the concentration of the Si in the filler becomes high, the core material and/or the opposing material tend to erode due to the filler. From the viewpoint of avoiding these problems, it is preferable to set the amount of Si in the intermediate material to 13.0 mass % or less and more preferably to 12.0 mass % or less.

Zn: 0.90 mass % or more and 6.0 mass % or less

By setting the amount of Zn in the intermediate material to 0.90 mass % or more, the intermediate material is made to function as a sacrificial anode material, which can further improve the corrosion resistance of the core material after brazing. However, if the Zn content in the intermediate material becomes excessively large, then the amount of Zn that diffuses from the intermediate material to the filler material will become large and the amount of Zn that liquates to the filler will also become large. Then, if the Zn concentration in the filler becomes excessively high, then there is a risk that preferential corrosion will tend to occur in the joint after brazing, which would lead to a decrease in corrosion resistance after brazing. Furthermore, in this situation, because the melting point of the intermediate material would decrease, there is also a risk that the filler would tend to permeate into the intermediate material, which could lead to a degradation in brazeability. From the viewpoint of avoiding these problems, it is preferable to set the amount of Zn in the intermediate material to 6.0 mass % or less.

Cu: 0.20 mass % or more and 2.0 mass % or less

Cu in the intermediate material functions to adjust the electric potential of the intermediate material and the joint after being brazed. Owing to the fact that Cu is added, in the specified range, together with Zn to the intermediate material, a decrease in the corrosion resistance of the joint due to Zn can be inhibited. In addition, in this situation, the melting point of the intermediate material can be suitably decreased. Consequently, it is possible to cause the Mg to elute into the filler at an earlier stage and to further increase the amount of Mg that elutes into the filler. As a result, the oxide film on the filler-material surface can be more rapidly broken down. If the Cu content is less than 0.20 mass %, then there is a risk that the effects described above will no longer be sufficiently obtained. On the other hand, if the Cu content is greater than 2.0 mass %, then the electric potential of the joint will rise and there is a risk that this will lead to a degradation in corrosion resistance.

Be (beryllium): 0.050 mass % or more and 0.20 mass % or less

Be in the intermediate material diffuses toward the filler-material surface during heating when brazing is being performed. In addition, the Be elutes into the filler after melting of the filler material. Owing to the fact that the Be makes contact with the oxide film on the filler-material surface, Be-containing oxides can be formed in the oxide film, which is composed of $Al_2O_3$. Then, the oxides that contain this Be have the effect of weakening the entire oxide film.

By setting the amount of Be in the intermediate material to 0.050 mass % or more, the oxide film can be further weakened by the Be-containing oxides, and, in turn, brazeability can be further improved. On the other hand, if the amount of Be is excessively large, then the above-mentioned amount of oxides will become excessively large, and there is a risk that this will lead to a degradation in brazeability. From the viewpoint of avoiding these problems, it is preferable to set the amount of Be to 0.20 mass % or less.

In addition to Mg, Si, Zn, Cu, and Be described above, Fe, Mn, Zr, Ti, and Bi may be suitably included in the intermediate material. In addition, trace amounts of In and/or Sn may be included in the intermediate material to adjust the electric potential. It is noted that these elements are all optional components.

<Filler Material>

Si: 6.0 mass % or more and 13.0 mass % or less

By setting the Si content in the filler material in the above-mentioned specified range, a sufficient amount of filler can be supplied to the intended joint that joins the opposing materials, and thereby a satisfactory fillet can be formed. If the amount of Si is less than 6.0 mass %, then there is a risk that problems will occur, such as the amount of filler being insufficient or the fluidity of the filler decreasing.

If the amount of Si is greater than 13.0 mass %, then there is a risk that the melted amount of the core material will become excessively large during heating when brazing is being performed. In addition, in this situation, coarse primary phase Si tends to form in the filler material. Then, after melting of the filler material, there is a risk that well-shaped melt holes will tend to form, in which the coarse primary phase Si are the starting points. Furthermore, in this situation, there is also a risk that cracks will occur during hot rolling of the filler material or the brazing sheet.

Mg: 0.050 mass % or more and less than 0.10 mass %

By setting the amount of Mg in the filler material in the above-mentioned specified range, the oxide film present on the filler-material surface before melting of the filler material can be weakened while oxidation of the filler-material surface can be inhibited, as described above. Furthermore, owing to the existence of both Mg and Bi in the filler, these elements function synergistically and provide functions and effects in which the formation rate of the fillet is increased. As a result, a satisfactory fillet can be rapidly formed at the intended joint.

If the amount of Mg in the filler material is less than 0.050 mass %, then there is a risk that the effect of weakening the oxide film will become insufficient, thereby leading to a degradation in brazeability. If the amount of Mg in the filler material is 0.10 mass % or more, then there is a risk that a sturdy oxide film will be formed on the surface of the filler material during heating when brazing is being performed, which will lead to a degradation in brazeability.

Bi: 0.0040 mass % or more and 0.070 mass % or less

By setting the amount of Bi in the filler material in the above-mentioned specified range, the surface tension of the filler can be reduced, and the fluidity of the filler can be increased. Furthermore, owing to the coexistence of Mg and Bi in the filler, these elements function synergistically and thus functions and effects are provided in which the formation rate of the fillet is increased. As a result, a satisfactory fillet can be rapidly formed at the intended joint that joins the opposing materials.

If the Bi content is less than 0.0040 mass %, then there is a risk that the functions and effects described above will become insufficient, thereby leading to degradation in brazeability. In addition, if the Bi content is greater than 0.070 mass %, then the filler-material surface will tend to be oxidized. As a result, there is a risk that a sturdy oxide film will be formed on the surface of the filler material during heating when brazing is being performed and, depending on the circumstances, there is a risk that brazeability will degrade.

To further increase the functions and effects produced by the coexistence of Mg and Bi described above, it is preferable to adjust the balance between the amount of Bi and the amount of Mg in the molten filler to an appropriate range. Here, the amount of Mg in the molten filler is the sum of the amount of Mg included beforehand in the filler material and the amount of Mg that diffused from the intermediate material into the filler material. For this reason, if the amount of Mg in the intermediate material is small, then it is preferable to likewise make the amount of Bi in the filler material accordingly small. For example, if the amount of Mg in the intermediate material is 0.20 mass % or more and less than 1.0 mass %, then, by setting the amount of Bi in the filler material to 0.0040 mass % or more and less than 0.030 mass %, the balance between the amount of Bi and the amount of Mg can be set in a suitable range.

In addition to the essentially included Si, Mg, and Bi, the filler material may further optionally contain other elements. Sb (antimony), Pb (lead), Ba (barium), Na (sodium), Sr (strontium), Fe (iron), Mn (manganese), Ti (titanium), Zn (zinc), Cu (copper), and the like are examples of optional components that can be included in the filler material.

Sb: 0.0070 mass % or more and 0.050 mass % or less, Pb: 0.0040 mass % or more and 0.070 mass % or less, Ba: 0.0040 mass % or more and 0.070 mass % or less The filler material may further contain one or two or more from among these elements. These elements function to adjust the fluidity such that the fluidity of the filler becomes higher.

With regard to the brazing sheet described above, the Bi included in the filler material acts to increase the fluidity of the filler and, in turn, to promote the formation of the fillet. However, depending on the location and/or the shape of the intended joint, there are situations in which the formation of the fillet can be promoted much more by further increasing the fluidity of the filler. In such a situation, by adding one or two or more from among the above-mentioned elements, the fluidity of the filler can be further increased.

However, if the content of these elements becomes excessively large, then there is a risk that the fluidity of the filler will become excessively high and formation of the fillet will become difficult. For this reason, by setting the content of the Sb, Pb, and Ba in the respective above-mentioned specified ranges, the fluidity of the filler can be adjusted to a suitable range, and thereby formation of the fillet up to the intended joint can be further promoted.

Na: 0.0020 mass % or more and 0.020 mass % or less, Sr: 0.0020 mass % or more and 0.050 mass % or less The filler material may further contain one or two from among these elements. These elements can all reduce the particle size of Si particles in the filler material. By adding at least one from among 0.0020 mass % or more of Na and 0.0020 mass % or more of Sr to the filler material, the occurrence of well-shaped melt holes, in which Si particles are the starting points, during heating when brazing is being performed can be inhibited. In addition, in this situation, perforation of the core material by the melt holes can also be inhibited.

However, if the content of these elements becomes excessively large, there is a risk that, instead, formation of the fillet will become difficult. By setting the content of these elements in the above-mentioned specified ranges, the adverse effects on fillet formation can be avoided while at the same time the formation of melt holes into the core material and the perforation of the core material during heating when brazing is being performed can be inhibited.

Fe: 0.050 mass % or more and 0.80 mass % or less, Mn: 0.050 mass % or more and 0.20 mass % or less, Ti: 0.010 mass % or more and 0.15 mass % or less The filler material may further contain one or two or more from among these elements. These elements function to adjust the fluidity such that the fluidity of the filler becomes lower.

With regard to the brazing sheet as described above, the Bi included in the filler material acts to increase the fluidity of the filler and, in turn, to promote the formation of the fillet. However, for example, in a situation in which the fillet is formed by causing the filler to flow in a direction against gravity, depending on the location or shape of the intended joint, the formation of the fillet can be promoted much more by decreasing the fluidity of the filler. In such a situation, by adding one or two or more from among the above-mentioned elements, the fluidity can be adjusted such that the fluidity of the filler becomes lower.

However, if the content of these elements becomes excessively large, then there is a risk that the fluidity of the filler will become excessively low and the formation of the fillet will become difficult. For this reason, by setting the content of the Fe, Mn, and Ti in the above-mentioned respective specified ranges, the fluidity of the filler can be adjusted to a suitable range, and therefore the formation of the fillet up to the intended joint can be further promoted.

Zn: 0.050 mass % or more and 3.0 mass % or less

The filler material may further contain Zn. By setting the Zn content in the filler material in the above-mentioned specified range, the electric potential of the filler material can be appropriately reduced. Thereby, the filler material can be caused to function as a sacrificial anode material, and corrosion of the aluminum product can be impeded for a longer time.

If the Zn content is greater than the above-mentioned specified range, then there is a risk that the electric potential of the filler material will become excessively low, and maintaining the sacrificial corrosion-inhibiting effect over the long term will become difficult.

Cu: 0.020 mass % or more and 1.0 mass % or less

The filler material may further contain Cu. By setting the Cu content in the filler material in the above-mentioned specified range, the electric potential of the filler material can be adjusted. Thereby, the filler material can be caused to function as a sacrificial anode material and corrosion resistance of the aluminum product can be further improved. Furthermore, in this situation, the melting point of the filler material can be reduced, and brazeability can also be further improved.

If the Cu content is greater than the above-mentioned specified range, then there is a risk that the electric potential of the filler material will excessively rise, and it will become difficult to maintain the sacrificial corrosion-inhibiting effect over the long term.

The filler material may contain elements other than the elements described above. However, if the content of elements, such as Li (lithium), Be (beryllium), Ca (calcium), and the like, which have low free energy of oxide formation, becomes large, then the filler-material surface will tend to be oxidized during heating when brazing is being performed, which will lead to degradation in brazeability. Accordingly, from the viewpoint of avoiding degradation in brazeability, it is preferable to make the content of these elements small. For example, by restricting the amount of Li in the filler material to less than 0.0040 mass %, the amount of Be in the filler material to less than 0.0040 mass %, and the amount of Ca in the filler material to less than 0.0030 mass %, degradation in brazeability caused by these elements can be avoided.

<Sacrificial Anode Material>

In addition to the above-mentioned intermediate material and the above-mentioned filler material, the brazing sheet may further comprise a sacrificial anode material. That is, the brazing sheet may comprise the core material, the intermediate material and the filler material, which are layered on one sheet surface of the core material, and the sacrificial anode material, which is layered on the other sheet surface of the core material. The sacrificial anode material may have a chemical composition containing one or two or more from among Zn: 0.90 mass % or more and 6.0 mass % or less, In: 0.010 mass % or more and 0.10 mass % or less, and Sn: 0.010 mass % or more and 0.10 mass % or less, the remainder being Al and unavoidable impurities.

By layering the sacrificial anode material, which has the above-mentioned specified chemical composition, on the core material, corrosion of the aluminum product can be inhibited for a longer time. If the content of any one of Zn, In, and Sn is greater than the above-mentioned respective specified ranges, then there is a risk that the electric potential of the sacrificial anode material will excessively decrease. As a result, maintaining the sacrificial corrosion-inhibiting effect over the long term will become difficult.

For example, a method in which a cladding mass is prepared by superposing a core-material mass having the chemical composition of the core material, an intermediate-material mass having the chemical composition of the intermediate material, and a filler-material mass having the chemical composition of the filler material and then the cladding mass is rolled can be used as the method of manufacturing the brazing sheet. The brazing sheet resulting from this method has an oxide film, which is formed on the surface of the filler material in the manufacturing process. With regard to the brazing sheet, because the Mg in the intermediate material can break down the oxide film on the filler-material surface, the fillet can be easily formed at the intended joint that joins the opposing materials, even if the oxide film on the filler-material surface is not removed by a process such as etching.

In addition, after the clad sheet has been prepared by rolling the cladding mass, the clad sheet may be etched by an acid or an alkali. In this situation, in the process of manufacturing the brazing sheet, the oxide film formed on the surface of the brazing sheet can be removed by etching and substituted with a natural oxidation film. This natural oxidation film is easily weakened by Mg. Consequently, brazeability can be further improved.

If the etching of the brazing sheet is performed before the brazing, it may be performed at any stage. For example, etching may be performed immediately after the manufacture of the brazing sheet, or etching may be performed after the brazing sheet has been formed into a desired shape.

In addition, after etching has been performed, a protective oil may be applied to the brazing-sheet surface. A protective oil having a decomposition temperature that is 200° C.-380° C. in an inert-gas atmosphere can be used as the protective oil. In addition, the application amount of the protective oil can be set to 500 mg/cm$^2$ or more. In this case, after etching, for example, oxidation of the surface of the brazing sheet due to condensation or the like can be inhibited over a longer term.

If the decomposition temperature of the protective oil is lower than 200° C., then there is a risk that the protective oil will vaporize while the brazing sheet is being stored, and thereby the surface of the brazing sheet will tend to be oxidized. In addition, if the decomposition temperature of the protective oil is higher than 380° C., then there is a risk that protective oil will remain on the filler-material surface during heating when brazing is being performed, which will lead to degradation in brazeability. If the application amount of the protective oil is less than 500 mg/cm$^2$, then there is a risk that the effect of inhibiting the oxidation of the brazing-sheet surface will become insufficient.

The brazing sheet can be used both in brazing performed in an inert-gas atmosphere in which flux is not used and performed in brazing in a vacuum in which flux is not used. In the case of brazing in an inert-gas atmosphere using the brazing sheet, in the initial stage of brazing, as described above, the oxide film present on the filler-material surface is weakened by the Mg in the filler material. Then, after the filler has melted, the Mg in the filler, that is, the Mg that was contained in the filler material and the Mg that moved from the intermediate material into the filler, reacts with the oxide film, and thereby the oxide film present on the filler-material surface and the oxide film present on the opposing-material surfaces can both be broken down. Thereby, a satisfactory fillet can be rapidly formed at the intended joint.

If brazing is performed in a vacuum, then, the same as in brazing in an inert-gas atmosphere as described above, the oxide film on the filler-material surface is weakened by the Mg in the filler material in the initial stage of brazing. In addition, after the filler has melted, the same as in brazing in an inert-gas atmosphere, the oxide film present on the filler-material surface and the oxide film present on the opposing-material surface can both be broken down by the reaction with the Mg in the filler. Furthermore, in addition to those mechanisms, in the temperature range above 575° C., at which the filler material fully melts, Mg evaporates from the filler and the oxide film present on the filler-material surface can be mechanically broken down.

Thus, when performing the brazing in a vacuum, after the filler material has melted, both mechanisms exist (take place), namely: the breakdown of the oxide film by the reaction with Mg, and the breakdown of the oxide film by the evaporation of Mg. Consequently, the oxide film can be broken down more rapidly than by performing the brazing in an inert-gas atmosphere. Accordingly, if the brazing sheet is used when performing the brazing in a vacuum, then brazeability can be further improved beyond that of brazing in an inert-gas atmosphere.

Working Examples

Working examples of the brazing sheet and the manufacturing method thereof are explained below. It is noted that the brazing sheet and the manufacturing method thereof according to the present invention are not limited to the modes below, and the constitutions can be modified as appropriate within a range that does not depart from the gist thereof.

In the present example, first, core-material masses, intermediate-material masses, and filler-material masses having the chemical compositions shown in Table 1 and Table 2 were prepared. These masses were superposed such that they form the layered structures described in Table 1 and Table 2, after which cladding masses were prepared by joining these masses to one another by hot rolling. Then, by performing appropriate combinations of hot rolling and cold rolling on the cladding masses, brazing sheets (Test Materials A1-A5, B1-B5) were prepared.

Each of the 1-A5, B3-B5 had a three-layer structure in which the intermediate material and the filler material were successively layered on one side of the core material. In addition, each of the Test Materials B1-B2 had a two-layer structure in which the filler material was layered on one side of the core material. The thickness of all the test materials was set to 400 μm. In addition, cold rolling was performed in the final stage of the process of manufacturing the test materials, after which each test material was tempered to an O material by performing a final annealing.

It is noted that, with regard to Test Material B6, in which the amount of Mg in the intermediate material was greater than the above-mentioned specified range, after the core-material mass, the intermediate-material mass, and the filler-material mass were superposed and hot rolling was performed, the masses could not be joined to one another, and a cladding mass could not be prepared. Consequently, brazing sheets could not be prepared for Test Material B6.

Figure 2:
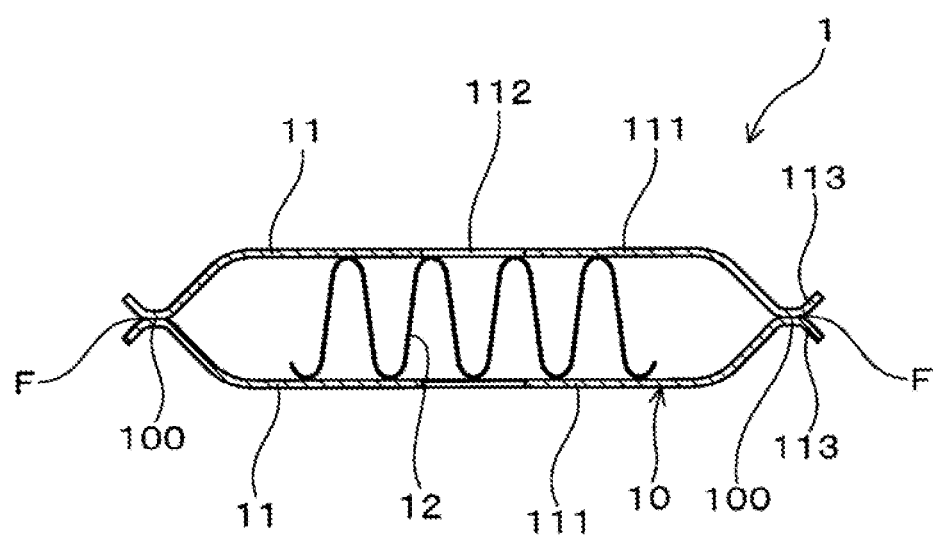
FIG. 2 is an auxiliary cross-sectional view taken along line II-II in FIG. 1.

Cup-shaped test specimens 1 (test specimens C1-C19 and test specimens D1-D14 in Table 3 and Table 4) shown in FIG. 1 and FIG. 2 were prepared using the Test Materials A1-A5 and the Test Materials B1-B5 obtained based on the above. Then, brazeability evaluations were performed using these cup-shaped test specimens 1. The cup-shaped test specimens 1 were prepared specifically using the following method. First, sheet materials, which were sampled from the test materials, were press-worked to prepare the circular cups 11 shown in FIG. 1 and FIG. 2. The diameter of each cup 11 was set to 30 mm, and a vent 112, having a diameter of 5 mm, was formed in the center of a bottom part 111 of each cup 11. A flange 113 was formed on an outer-circumferential edge portion of each cup 11. In addition, each cup 11 was formed such that the filler material was on the inner side.

A degreasing treatment was performed by cleaning the resulting cups 11 with acetone. In addition, for some of the test specimens shown in Table 3 and Table 4, the cups 11 were etched by immersing them in an acid solution after the degreasing treatment.

Separate from these cups 11, corrugated fins 12 composed of JIS A3003 alloy were prepared. Then, a degreasing treatment was performed by cleaning the corrugated fins 12 with acetone.

Two of the cups 11 and the corrugated fin 12 were combined to assemble each test specimen 1 shown in FIG. 1 and FIG. 2. Test specimen 1 comprises a hollow member 10, which comprises two of the cups 11, and the corrugated fin 12, which is disposed in the interior of the hollow member 10. The hollow member 10 has a contact portion 100, along which the flanges 113 of the cups 11 contact one another. In addition, the corrugated fin 12 makes contact with the bottom part 111 of each cup 11.

Each test specimen 1 assembled as described above was brazed in an atmosphere of nitrogen or in a vacuum, as shown in Table 3 and Table 4. In brazing performed in a nitrogen atmosphere, the oxygen concentration in the brazing chamber was controlled such that the oxygen concentration in the brazing chamber was in the range of either 9-11 ppm or 25-28 ppm. The actual oxygen concentration during brazing of each test specimen was as shown in Table 3 and Table 4. In addition, in brazing performed in a nitrogen atmosphere, heating conditions were used in which the heating-end temperature was set to 600° C. and the average temperature-rise rate from when the temperature reached 450° C. until it reached 600° C. was either 12.5° C./min or 50° C./min.

In brazing performed in a vacuum, the pressure inside the brazing furnace was controlled such that the pressure was $7 \times 10^{-3}$–$9 \times 10^{-3}$ Pa. The actual in-furnace pressure during brazing of each test specimen was as shown in Table 3 and Table 4. In addition, in brazing performed in a vacuum, heating conditions were used in which the heating-end temperature was set to 600° C. and the average temperature-rise rate from when the temperature reached 450° C. until it reached 600° C. was 12.5° C./min.

According to the above, cup-shaped test specimens 1 (test specimens C1-C19 and test specimens D1-D14 in Table 3 and Table 4) were obtained. The resulting test specimens 1 were visually observed, and the external appearance of a fillet F (refer to FIG. 2), which formed on an outer side of each contact portion 100, was evaluated. In cases in which the fillet had a uniform shape, symbol "A" was recorded in the "Fillet-Shape Evaluation" column in Table 3 and Table 4. In cases in which the fillet shape had a somewhat uneven portion but a continuous fillet was formed, symbol "B" was recorded. In cases in which the size of the fillet was small or the size of the fillet was irregular but a continuous fillet was formed, symbol "C" was recorded in the same column.

In cases in which a stitch was produced on the outer side of the contact portion 100, symbol "D" was recorded in the same column. In cases in which a fillet was not formed on the outer side of the contact portion 100, symbol "E" was recorded in the same column. Here, the above-mentioned "stitch" refers to the state in which the fillet was discontinuously formed, that is, the state in which the fillet was intermittent due to a pinhole-shaped defect or the like, and it looked like a seam. A stitch does not necessarily lead to the occurrence of leakage of the contents from the hollow member 10; however, they are often handled, together with cases in which a fillet is not formed, as defective products because of the effect on the joint quality of the product.

In the fillet-shape evaluation, the cases of symbols A-C, in which a continuous fillet was formed, were judged to be acceptable because satisfactory fillets were formed. In addition, the cases of symbols D, E, in which a stitch occurred or a fillet was not formed, were judged to be unacceptable because of a risk of a brazing defect.

TABLE 1

| Test Specimen Symbol | Layered Structure | Thickness (μm) Per Layer | Thickness (μm) Total | Chemical Composition (mass %) Si | Fe | Cu | Mg | Mn | Zn | Bi | Be |
|---|---|---|---|---|---|---|---|---|---|---|---|
| A1 | Filler material | 40 | 400 | 10 | 0.18 | — | 0.080 | — | — | 0.020 | — |
|  | Intermediate material | 15 |  | — | — | — | 2.5 | — | — | — | — |
|  | Core material | 345 |  | 0.10 | 0.60 | 0.15 | 0.60 | 1.2 | — | — | — |
| A2 | Filler material | 40 | 400 | 10 | 0.18 | — | 0.050 | — | — | 0.020 | — |
|  | Intermediate material | 10 |  | — | — | — | 6.0 | — | — | — | — |
|  | Core material | 350 |  | 0.10 | 0.60 | 0.15 | — | 1.2 | — | — | — |
| A3 | Filler material | 25 | 400 | 10 | 0.18 | — | 0.090 | — | — | 0.020 | — |
|  | Intermediate material | 15 |  | 10 | 0.18 | — | 0.40 | — | — | — | — |
|  | Core material | 360 |  | 0.10 | 0.60 | 0.15 | 0.60 | 1.2 | — | — | — |
| A4 | Filler material | 40 | 400 | 10 | 0.18 | — | 0.070 | — | — | 0.020 | — |
|  | Intermediate material | 15 |  | — | — | 0.60 | 1.2 | — | 1.8 | — | — |
|  | Core material | 345 |  | 0.10 | 0.60 | 0.15 | — | 1.2 | — | — | — |
| A5 | Filler material | 30 | 400 | 10 | 0.18 | — | 0.080 | — | — | 0.020 | — |
|  | Intermediate material | 10 |  | 10 | 0.18 | — | 1.8 | — | — | — | 0.10 |
|  | Core material | 360 |  | 0.10 | 0.60 | 0.15 | 0.60 | 1.2 | — | — | — |

TABLE 2

| Test Specimen Symbol | Layered Structure | Thickness (μm) Per Layer | Thickness (μm) Total | Chemical Composition (mass %) Si | Fe | Cu | Mg | Mn | Zn | Bi | Be |
|---|---|---|---|---|---|---|---|---|---|---|---|
| B1 | Filler material | 40 | 400 | 10 | 0.18 | — | 0.080 | — | — | 0.020 | — |
|  | Core material | 360 |  | 0.10 | 0.60 | 0.15 | 0.60 | 1.2 | — | — | — |
| B2 | Filler material | 40 | 400 | 10 | 0.18 | — | — | — | — | 0.020 | — |
|  | Core material | 360 |  | 0.10 | 0.60 | 0.15 | 0.60 | 1.2 | — | — | — |
| B3 | Filler material | 40 | 400 | 10 | 0.18 | — | 0.040 | — | — | 0.020 | — |
|  | Intermediate material | 15 |  | — | — | — | 2.5 | — | — | — | — |
|  | Core material | 345 |  | 0.10 | 0.60 | 0.15 | 0.60 | 1.2 | — | — | — |
| B4 | Filler material | 40 | 400 | 10 | 0.18 | — | 1.1 | — | — | 0.020 | — |
|  | Intermediate material | 15 |  | — | — | — | 2.5 | — | — | — | — |
|  | Core material | 345 |  | 0.10 | 0.60 | 0.15 | 0.60 | 1.2 | — | — | — |
| B5 | Filler material | 25 | 400 | 10 | 0.18 | — | 0.080 | — | — | 0.020 | — |
|  | Intermediate material | 15 |  | 10 | — | — | 0.25 | — | — | — | — |
|  | Core material | 360 |  | 0.10 | 0.60 | 0.15 | 0.60 | 1.2 | — | — | — |
| B6 | Filler material | 40 | 400 | 10 | 0.18 | — | 0.080 | — | — | 0.020 | — |
|  | Intermediate material | 10 |  | — | — | — | 6.5 | — | — | — | — |
|  | Core material | 360 |  | 0.10 | 0.60 | 0.15 | — | 1.2 | — | — | — |

TABLE 3

| Test Specimen Symbol | Test Material Symbol | Etching | Brazing Conditions Brazing Atmosphere | Oxygen Concentration (ppm) | In-Furnace Pressure (Pa) | Average Temperature-Rise Rate (° C./min) | Fillet-Shape Evaluation |
|---|---|---|---|---|---|---|---|
| C1 | A1 | No | Nitrogen | 9.2 | — | 12.5 | A |
| C2 | A1 | Yes | Nitrogen | 9.3 | — | 12.5 | A |
| C3 | A1 | No | Nitrogen | 25.3 | — | 12.5 | B |
| C4 | A1 | No | Nitrogen | 10.6 | — | 50 | B |
| C5 | A1 | No | Nitrogen | 27.6 | — | 50 | C |
| C6 | A2 | No | Nitrogen | 10.4 | — | 50 | A |
| C7 | A3 | No | Nitrogen | 9.4 | — | 12.5 | B |
| C8 | A3 | No | Nitrogen | 27.1 | — | 12.5 | C |
| C9 | A4 | Yes | Nitrogen | 10.8 | — | 50 | B |
| C10 | A4 | No | Nitrogen | 9.1 | — | 12.5 | A |

TABLE 3-continued

| Test Specimen Symbol | Test Material Symbol | Etching | Brazing Atmosphere | Oxygen Concentration (ppm) | In-Furnace Pressure (Pa) | Average Temperature-Rise Rate (° C./min) | Fillet-Shape Evaluation |
|---|---|---|---|---|---|---|---|
| C11 | A5 | No | Nitrogen | 26.6 | — | 12.5 | B |
| C12 | A5 | No | Nitrogen | 9.3 | — | 50 | A |
| C13 | A5 | No | Nitrogen | 27.7 | — | 50 | B |
| C14 | A5 | Yes | Nitrogen | 27.6 | — | 50 | B |
| C15 | A1 | No | Vacuum | — | $7.9 \times 10^{-3}$ | 12.5 | A |
| C16 | A2 | No | Vacuum | — | $7.7 \times 10^{-3}$ | 12.5 | A |
| C17 | A3 | No | Vacuum | — | $8.4 \times 10^{-3}$ | 12.5 | B |
| C18 | A4 | No | Vacuum | — | $8.1 \times 10^{-3}$ | 12.5 | A |
| C19 | A5 | No | Vacuum | — | $7.7 \times 10^{-3}$ | 12.5 | A |

TABLE 4

| Test Specimen Symbol | Test Material Symbol | Etching | Brazing Atmosphere | Oxygen Concentration (ppm) | In-Furnace Pressure (Pa) | Average Temperature-Rise Rate (° C./min) | Fillet-Shape Evaluation |
|---|---|---|---|---|---|---|---|
| D1 | B1 | No | Nitrogen | 27.2 | — | 12.5 | D |
| D2 | B1 | Yes | Nitrogen | 9.9 | — | 50 | D |
| D3 | B2 | No | Nitrogen | 9.5 | — | 12.5 | D |
| D4 | B2 | No | Nitrogen | 26.9 | — | 12.5 | E |
| D5 | B2 | Yes | Nitrogen | 25.8 | — | 12.5 | D |
| D6 | B3 | No | Nitrogen | 9.3 | — | 50 | D |
| D7 | B3 | No | Nitrogen | 27.6 | — | 12.5 | D |
| D8 | B4 | No | Nitrogen | 27.4 | — | 12.5 | D |
| D9 | B4 | No | Nitrogen | 25.4 | — | 50 | E |
| D10 | B5 | No | Nitrogen | 10.3 | — | 50 | E |
| D11 | B5 | Yes | Nitrogen | 10.1 | — | 50 | D |
| D12 | B1 | No | Vacuum | — | $8.2 \times 10^{-3}$ | 12.5 | D |
| D13 | B2 | No | Vacuum | — | $8.3 \times 10^{-3}$ | 12.5 | E |
| D14 | B5 | No | Vacuum | — | $8.2 \times 10^{-3}$ | 12.5 | D |

As shown in Table 3, the cups 11 used in test specimens C1-C19 were composed of 1-A5 having chemical compositions in the above-mentioned specified ranges. Consequently, with these test specimens, a satisfactory fillet could be formed even on the outer side of the contact portion 100 of each hollow member 10.

Among the test specimens C1-C14 for which brazing was performed in a nitrogen atmosphere, the test specimens C1, C2 and C10 were brazed in a low-oxygen-concentration atmosphere using heating conditions in which the average temperature-rise rate was 12.5° C./min, and fillets could be formed more satisfactorily than in the other test specimens. With regard to test specimen C6, because Test Material A2 was used, in which the amount of Mg in the intermediate material was comparatively large, a satisfactory fillet could be formed even with heating conditions in which the average temperature-rise rate was 50° C./min. In addition, with regard to test specimen C12, because the Test Material A5 was used, in which Be was included in the intermediate material, a satisfactory fillet could be formed even with heating conditions in which the average temperature-rise rate was 50° C./min.

In addition, from the comparisons between the test specimens C1 and C2, and between the test specimens C13 and C14, which were prepared under the same conditions, excepting the presence or absence of etching, it can be easily understood that, according to the brazing sheet having a chemical composition in the above-mentioned specified ranges, satisfactory fillets could be formed even if etching was not performed.

With regard to the test specimen C17 from among the test specimens C15-C19, in which brazing was performed in a vacuum, the shape of the fillet was somewhat uneven and, compared with other test specimens, brazeability was somewhat degraded. This is thought to be due to the fact that, because Test Material A3 was used, in which the amount of Mg in the intermediate material is comparatively small, the amount of Mg that evaporated from the molten filler became small, and therefore the effect of breaking down the oxide film became somewhat small.

On the other hand, as shown in Table 4, the cups 11 used in test specimens D1-D5 and D12-D13 were composed of Test Material B1 or B2, in which there was no intermediate material between the core material and the filler material. In these test specimens, the amount of Mg supplied from the intermediate material to the filler-material surface during brazing became small. As a result, a continuous fillet could not be formed on the outer side of the contact portion 100 of each hollow member 10 both in brazing performed in a nitrogen atmosphere and in brazing performed in a vacuum.

Among these test specimens, with regard to test specimen D4, which used Test Material B2, wherein Mg was not included in the filler material, and which was brazed in a nitrogen atmosphere having a comparatively high oxygen concentration, a fillet could not be formed at all on the outer side of the contact portion 100. In addition, likewise with regard to test specimen D13, which used Test Material B2, wherein Mg was not included in the filler material, and which was brazed in a vacuum, a fillet could not be formed at all on the outer side of the contact portion 100.

The cups 11 used in test specimens D6-D7 were composed of Test Material B3, in which the amount of Mg in the filler material was smaller than the above-mentioned specified range. Consequently, in the initial stage of brazing, the effect of weakening the oxide film on the filler-material surface became small, which led to a decrease in brazeability.

The cups 11 used in test specimens D8-D9 were composed of Test Material B4, in which the amount of Mg in the filler material was greater than the above-mentioned specified range. Consequently, owing to the heating during brazing, a sturdy oxide film was formed on the filler-material surface, which led to a decrease in brazeability.

The cups 11 used in test specimens D10-D11 and D14 were composed of Test Material B5, in which the amount of Mg in the intermediate material was less than the above-mentioned specified range. In these test specimens, the amount of Mg supplied from the intermediate material to the filler-material surface during brazing became small. As a result, a continuous fillet could not be formed on the outer side of the contact portion 100 of each hollow member 10 both in brazing performed in a nitrogen atmosphere and in brazing performed in a vacuum.

The invention claimed is:

1. A brazing sheet usable in brazing performed in an inert-gas atmosphere or in a vacuum without using a flux, comprising:
    a core material having a chemical composition containing Mg: 1.3 mass % or less, the remainder being Al and unavoidable impurities;
    an intermediate material having a chemical composition containing Mg: 0.40 mass % or more and 6.0 mass % or less, the remainder being Al and unavoidable impurities, and being layered on the core material; and
    a filler material having a chemical composition containing Si: 6.0 mass % or more and 13.0 mass % or less, Bi: 0.0040 mass % or more and 0.070 mass % or less, and Mg: 0.050 mass % or more and less than 0.10 mass %, the remainder being Al and unavoidable impurities, and being layered on the intermediate material.

2. The brazing sheet according to claim 1, wherein the intermediate material further contains Si: 1.0 mass % or more and 13.0 mass % or less.

3. The brazing sheet according to claim 1, wherein the core material further contains one or two or more elements selected from the group consisting of: Mn: 0.30 mass % or more and 2.0 mass % or less, Si: 0.10 mass % or more and 1.0 mass % or less, Fe: less than 1.0 mass %, Cu: 1.0 mass % or less, Ti: less than 0.10 mass %, Zr: less than 0.30 mass %, and Cr: less than 0.30 mass %.

4. The brazing sheet according to claim 1, wherein the Mg content in the core material is less than 1.0 mass %.

5. The brazing sheet according to claim 4, wherein the Bi content in the filler material is less than 0.030 mass %.

6. The brazing sheet according to claim 3, wherein the Mg content in the core material is less than 1.0 mass %.

7. The brazing sheet according to claim 6, wherein the Bi content in the filler material is less than 0.030 mass %.

8. The brazing sheet according to claim 7, wherein the intermediate material further contains Si: 1.0-13.0 mass %.

9. The brazing sheet according to claim 7, wherein the intermediate material further contains Zn: 0.9-6.0 mass %.

10. The brazing sheet according to claim 9, wherein the intermediate material further contains Cu: 0.20-2.0 mass %.

11. The brazing sheet according to claim 7, wherein the intermediate material directly contacts the core material and the filler material directly contacts the intermediate material.

12. The brazing sheet according to claim 1, wherein:
    the Mg content in the intermediate material is 0.20-1.0 mass %, and
    the Bi content in the filler material is 0.0040-0.030 mass %.

13. The brazing sheet according to claim 1, wherein the intermediate material directly contacts the core material and the filler material directly contacts the intermediate material.

14. A method of manufacturing the brazing sheet according to claim 1, comprising:
    preparing a cladding mass by superposing a core-material mass having the chemical composition of the core material according to claim 1, an intermediate-material mass having the chemical composition of the intermediate material according to claim 1, and a filler-material mass having the chemical composition of the filler material according to claim 1;
    preparing a clad sheet by rolling the cladding mass; and
    etching the clad sheet using an acid or an alkali.

15. The method of manufacturing the brazing sheet according to claim 14, comprising:
    after the etching has been performed, applying 500 mg/cm' or more of a protective oil, which has a decomposition temperature that is 200-380° C. in an inert gas atmosphere, to a surface of the brazing sheet.

16. A brazing sheet, comprising:
    a core composed of an aluminum alloy comprising 0-1.3 mass % Mg;
    an intermediate material layered on the core and being composed of an aluminum alloy comprising 0.4-6.0 mass % Mg; and
    a filler layered on the intermediate material and being composed of an aluminum alloy comprising 6.0-13.0 mass % Si, 0.0040-0.070 mass % Bi, and 0.050-0.10 mass % Mg.

17. The brazing sheet according to claim 16, wherein:
    the Mg content in the core material is less than 1.0 mass %;
    the Bi content in the filler material is less than 0.030 mass %; and
    the filler further contains Fe: 0.18-0.50 mass %.

18. The brazing sheet according to claim 17, wherein the core material further contains: Mn: 0.30-2.0 mass %, Si: 0.10-1.0 mass %, Fe: 0.6-1.0 mass %, and Cu: 0.15-1.0 mass %.

19. The brazing sheet according to claim 18, wherein:
    a first surface of the intermediate material directly contacts the core;
    the filler directly contacts a second surface of the intermediate material that is opposite of the first surface of the intermediate material such that the intermediate material is sandwiched between the core and the filler; and the filler is an outermost layer of the brazing sheet.

20. A brazing sheet usable in brazing performed in an inert-gas atmosphere or in a vacuum without using a flux, comprising:

a core material having a chemical composition containing Mg: 1.0 mass % or less and one or more elements selected from the group consisting of: Mn: 0.30-2.0 mass %, Si: 0.10-1.0 mass %, Fe: less than 1.0 mass %, Cu: 1.0 mass % or less, Ti: less than 0.10 mass %, Zr: less than 0.30 mass %, and Cr: less than 0.30 mass %, the remainder being Al and unavoidable impurities;

an intermediate material layered on the core material and having a chemical composition containing Mg: 0.40-6.0 mass % and Be: 0.050-0.20 mass %, the remainder being Al and unavoidable impurities; and a filler material layered on the intermediate material and having a chemical composition containing Si: 6.0-13.0 mass %, Bi: 0.0040-0.030 mass %, and Mg: 0.050-0.10 mass %, the remainder being Al and unavoidable impurities.

* * * * *